United States Patent
Viste et al.

(10) Patent No.: US 6,939,774 B2
(45) Date of Patent: Sep. 6, 2005

(54) LOW FREEZING ELECTROLYTE FOR AN ELECTROLYTIC CAPACITOR

(75) Inventors: Mark Edward Viste, Brooklyn, MN (US); Joachim Hossick-Schott, Minneapolis, MN (US); Zhi Fang, Maple Grove, MN (US); Brian John Melody, Greer, SC (US); John Tony Kinard, Greer, SC (US)

(73) Assignees: Kemet Electronics, Greenville, SC (US); Medtronics, Inc., Minneapolis, MN (US)

( * ) Notice: Subject to any disclaimer, the term of this patent is extended or adjusted under 35 U.S.C. 154(b) by 0 days.

(21) Appl. No.: 10/826,606

(22) Filed: Apr. 16, 2004

(65) Prior Publication Data

US 2004/0240150 A1 Dec. 2, 2004

Related U.S. Application Data

(62) Division of application No. 10/449,440, filed on May 30, 2003.

(51) Int. Cl.[7] .............................. H01L 21/20; H01G 9/02
(52) U.S. Cl. ..................... 438/381; 438/171; 361/506; 361/504; 252/62.2
(58) Field of Search .................. 438/381, 171, 438/190, 238, 239, 243, 244, 250, 253, 329, 386, 387, 393, 396; 252/62.2; 361/523, 524, 525, 528, 529, 502, 503, 504, 505, 506, 508

(56) References Cited

U.S. PATENT DOCUMENTS

| | | | | |
|---|---|---|---|---|
| 4,076,899 | A | * | 2/1978 | Kring ........................... 429/42 |
| 5,160,653 | A | | 11/1992 | Clouse et al. ............... 252/62.2 |
| 5,716,511 | A | | 2/1998 | Melody et al. ............. 205/324 |
| 6,042,740 | A | * | 3/2000 | Uehara et al. ............. 252/62.2 |
| 6,219,222 | B1 | | 4/2001 | Shah et al. .................. 361/506 |
| 6,346,185 | B1 | * | 2/2002 | Kinard et al. ............... 205/316 |
| 6,349,028 | B1 | | 2/2002 | Komatsu ..................... 361/504 |
| 6,480,371 | B1 | | 11/2002 | Kinard et al. ............... 361/508 |
| 6,653,378 | B2 | | 11/2003 | Ferritto et al. .............. 524/267 |
| 6,674,635 | B1 | * | 1/2004 | Fife et al. .................... 361/523 |
| 2003/0090857 | A1 | | 5/2003 | Liu et al. ..................... 361/502 |

OTHER PUBLICATIONS

International Search Report, PCT/US2004/016998, Nov. 10, 2004, Dessaux.

* cited by examiner

Primary Examiner—David Nelms
Assistant Examiner—Long Tran
(74) Attorney, Agent, or Firm—Joseph T. Guy; Nexsen Pruet, LLC

(57) ABSTRACT

An electrolytic capacitor comprising an anode, cathode and an electrolyte. The electrolyte comprises: about 35–60%, by weight water; about 10–55%, by weight organic solvent; about 0.05 to 10%, by weight, sulphuric acid; about 0.05 to 10%, by weight, boric acid; and about 0.05 to 10%, by weight, phosphorus oxy acid.

19 Claims, No Drawings

LOW FREEZING ELECTROLYTE FOR AN ELECTROLYTIC CAPACITOR

CROSS-REFERENCE TO RELATED APPLICATIONS

The present application is a divisional application of U.S. Pat. appl. Ser. No. 10/449,440 filed May 30, 2003, which is pending.

BACKGROUND OF THE INVENTION

The present invention relates to an electrolyte for an electrolytic capacitor and a capacitor formed therewith.

There has been an ongoing demand for ever smaller electrical components to support the continual drive to smaller devices. Of particular interest for the present invention is the demand for smaller, yet higher capacitance density, electrolytic capacitors. This demand has exhausted the current technical capabilities thereby requiring further advances in the art. Such an advance is provided herein.

Electrolytic capacitors, particularly tantalum-based capacitors, have been prepared utilizing aqueous solutions of ethylene glycol with ionogens such as acetic acid and phosphoric acid and ammonium acetate. Capacitors of this type are exemplified in U.S. Pat. No. 6,219,222. While these capacitors have historically fulfilled many of the necessary requirements they are deficient. Other solvents are desirable that eliminate sparking and that improve resistance to electrochemical degradation.

Yet another problem associated with prior art working electrodes is the degradation of the electrolyte that occurs at low temperature. Prior art capacitors must be maintained at temperatures above the freezing point of the electrolyte. This has led away from the use of aqueous electrolytes while relinquishing the superior solubility properties and charge carrying properties of water. Water is greatly preferred over organic solvents yet the propensity for freezing is detrimental to its use as a solvent for working electrolytes.

The present invention is directed to an aqueous electrolyte, and capacitor containing the electrolyte, which mitigates the deficiencies of the prior art.

BRIEF SUMMARY OF THE INVENTION

It is an object of the present invention to provide an electrolytic capacitor which has a high breakdown voltage (150–300V) with suitable conductivity.

It is another object of the present invention to provide a working electrolyte, and capacitor activated by the electrolyte, which can withstand low temperatures, below about −30° C. without detriment to the capacitor or its properties.

A particular feature of the present invention is the ability to take advantage of the solubilizing and conduction properties of water while still providing a capacitor able to withstand temperature storage, or use, of at least −30° C. at about one atmosphere pressure.

These and other advantages, as would be realized to one of ordinary skill in the art, are provided in an electrolytic capacitor. The capacitor comprises an anode, cathode and an electrolyte. The electrolyte comprises about 35–60%, by weight water; about 10–55%, by weight organic solvent; about 0.05 to 10%, by weight, sulphuric acid; about 0.05 to 10%, by weight, boric acid; and about 0.05 to 10%, by weight, phosphorus oxy acid.

Another embodiment is provided in an electrolyte for activating a capacitor. The electrolyte comprises about 35–60%, by weight water; about 10–55%, by weight organic solvent; about 0.05 to 10%, by weight, sulphuric acid; about 0.05 to 10%, by weight, boric acid; and about 0.05 to 10%, by weight, phosphorus oxy acid.

Another embodiment is provided in a method for providing a capacitor comprising the steps of:
a) providing a tantalum anode;
b) providing a cathode;
c) activating the anode and the cathode with an electrolyte comprising: about 35–60%, by weight water; about 10–55%, by weight organic solvent; about 0.05 to 10%, by weight, sulphuric acid; about 0.05 to 10%, by weight, boric acid; and about 0.05 to 10%, by weight, phosphorus oxy acid; wherein the electrolyte has a pH below about 5 and a freezing point below about −30° C.

DETAILED DESCRIPTION OF THE INVENTION

The inventors have developed through diligent research an electrolyte, particularly suitable for use in electrolytic capacitors, comprising water, organic solvent and acids wherein the freezing point of the aqueous electrolyte is below −30° C.

Electrolytic capacitors, particularly tantalum electrolytic capacitors, fabricated so as to manifest a large capacitance density (i.e., high capacitance per unit volume) at intermediate use voltages (i.e., from about 175 volts to about 250 volts) are generally fabricated from powder metallurgy compacts. The compacts are sintered at appropriately high temperature and are then anodized in an anodizing electrolyte prior to assembly into finished capacitors. During the assembly operation each anode compact is impregnated with a working or fill electrolyte which serves to conduct current from the cathode surface of the device to the anode oxide dielectric. Once the anode body is impregnated with a working electrolyte, the device is sealed so as to prevent escape of the liquid electrolyte. The device is typically tested prior to being placed into service. The working electrolyte usually is characterized as having a much lower resistance and dissipation factor than anodizing electrolytes. One undesirable consequence of the relatively low electrical resistivity of the working electrolyte is that the breakdown voltage of the electrolyte, that is the maximum voltage which the electrolyte-anode system will support regardless of the voltage to which the anode is anodized, is generally significantly lower than that of appropriate anodizing electrolytes. Working electrolytes have to be chosen so as to have a sufficiently high breakdown voltage so as not to cause premature failure during the working life of the device.

The aqueous working electrolyte solution of the present invention comprises about 35 to about 65%, by weight, water; about 10 to about 55%, by weight organic solvent; about 0.05 to about 10%, by weight, sulphuric acid, about 0.05 to about 10%, by weight, boric acid and about 0.05 to about 10%, by weight, phosphorus oxy acid.

More preferably the aqueous electrolyte comprises about 40 to about 60%, by weight, water and about 35 to about 55%, by weight, organic solvent; about 1 to 5%, by weight, sulphuric acid, about 1 to 5%, by weight, boric acid and about 1 to 5%, by weight, phosphorus oxy acid.

An alternate preferred aqueous electrolyte comprises about 40 to about 60%, by weight, water and about 35 to about 55%, by weight, organic solvent; and about 1 to 30%, by a mixture of ammonium acetate, acetic acid, boric acid and phosphorus oxy acid.

More preferably the aqueous electrolyte comprises about 40 to about 60%, by weight, water and about 35 to about 55%, by weight, organic solvent; about 1 to 5%, by weight, boric acid and about 1 to 5%, by weight, phosphorus oxy acid and about 1 to 5%, by weight, ammonium acetate with a sufficient amount of acetic acid to adjust pH.

The organic solvent is preferably selected from a group consisting of glycerol, 1,3-propane diol; 2-methyl-1,3-propane diol; propylene glycol; polyethylene glycol monomethyl ether; N-alkyl-2-pyrrolidone and diethylene glycol. The organic solvent specifically excludes ethylene glycol, formamide, dimethyl formamide and γ-butyrolactone.

Tantalum is the most preferred anode.

The cathode is a conductive metal provided with a semiconductive or metal-like conductive coating. The coating can be an oxide, nitride, carbide, or activated carbon. Suitable cathode metals include tantalum, iridium, platinum, palladium, gold, silver, ruthenium, tungsten, rhodium, vanadium and osmium. A particularly preferred cathode electrode comprises a porous ruthenium oxide film provided on a titanium substrate.

It is preferable that the electrolyte be maintained at an acidic pH. More preferred is a working electrolyte with a pH of below about 5. A pH of below about 4 is most preferred.

The pH is adjusted by balancing the sulphuric, boric and phosphorus oxy acid and ammonium hydroxide. Suitable phosphorus oxy acids are orthophosphoric acid and phosphorous acid. A particular advantage of the present invention is the observation that the combination of acids, as set forth herein, provides a suitably high breakdown voltage with an electrolyte solution which has a suitably high conduction and a low freezing point.

An optional, but preferred, separator material physically separates the anode and cathode from each other. The separator prevents electrical short circuits between the anode and cathode. The separator material is preferably unreactive with the anode, cathode and electrolyte and is sufficiently porous to allow the electrolyte to freely flow through the separator. Suitable separators include woven and non-woven fabrics of polyolefinic fibers, as known in the art.

A comparative electrolyte as described in Example 1 of U.S. Pat. No. 6,219,222 would be prepared. An inventive aqueous electrolyte was prepared comprising about 36% glycerol, about 8%, by weight ammonium acetate, about 8%, by weight, acetic acid and about 0.5%, by weight, phosphoric acid. The breakdown voltage was determined to be about 250 to 275 volts. The results were achieved without ethylene glycol and therefore the problems associated with the detrimental side products of the electrochemical oxidation of ethylene glycol are eliminated. These products, including formic and oxalic acid, decrease the sparking voltage with time. The decrease in sparking voltage is eliminated with the present invention.

The invention has been described with particular emphasis on the preferred embodiments. It would be realized from the teachings herein that other embodiments, alterations, and configurations could be employed without departing from the scope of the invention which is more specifically set forth in the claims which are appended hereto.

What is claimed is:

1. A method for providing a capacitor comprising the steps of:
   providing a tantalum anode;
   providing a cathode;
   activating said anode and said cathode with an electrolyte comprising:
   about 35–60%, by weight water;
   about 10–55%, by weight organic solvent excluding ethylene glycol, formamide, dimethyl formamide and γ-butyrolactone;
   about 0.05 to 30%, by weight, at least one acid selected from sulphuric, boric acid and phosphorus oxy acid;
      wherein said electrolyte has a pH below about 5 and a freezing point below about −30° C.

2. A method according to claim 1 wherein said phosphorus oxy acid is orthophosphoric acid.

3. A method according to claim 1 wherein said phosphorus oxy acid is phosphorous acid.

4. A method according to claim 1 wherein said electrolyte has a pH of less than about 4.

5. A capacitor prepared by the method according to claim 1.

6. A method according to claim 1 wherein said acid comprises sulphuric acid and at least one acid selected from boric acid and phosphorus oxy acid.

7. A method according to claim 6 wherein said acid comprises sulphuric acid, boric acid and phosphorus oxy acid.

8. A method according to claim 7 wherein said electrolytic solution comprises: about 0.05 to 10%, by weight, sulphuric acid;
   about 0.05 to 10%, by weight, boric acid; and
   about 0.05 to 10%, by weight, phosphorus oxy acid.

9. A method according to claim 1 wherein said solvent is selected from a group consisting of glycerol, 1,3-propane diol; 2-methyl-1,3-propane diol;
   propylene glycol; polyethylene glycol monomethyl ether; N-alkyl-2-pyrrolidone and diethylene glycol.

10. A method according to claim 9 wherein said solvent is glycerol.

11. A method according to claim 9 wherein said solvent is 1,3-propane diol.

12. A method according to claim 9 wherein said solvent is 2-methyl-1,3-propane diol.

13. A method according to claim 9 wherein said solvent is propylene glycol.

14. A method according to claim 9 wherein said solvent is polyethylene glycol monomethyl ether.

15. A method according to claim 9 wherein said cathode is a conductive metal provided with a semiconductive or metal-like conductive coating.

16. A method according to claim 15 wherein said cathode comprises a porous ruthenium oxide film provided on a titanium substrate.

17. A method according to claim 15 wherein said cathode is at least one element chosen from a group consisting of an oxide, a nitride, a carbide of a metal or an activated carbon.

18. A method according to claim 17 wherein said cathode comprises a metal selected from a group consisting of tantalum, titanium, nickel, iridium, platinum, palladium, gold, silver, cobalt, molybdenum, ruthenium, manganese, tungsten, iron, zirconium, hafnium, rhodium, vanadium, osmium and niobium.

19. A method according to claim 18 wherein when said acid comprises sulphuric acid, sufficient buffering material is added to raise the pH to a level sufficient to avoid dissolution of components of manufacture of said capacitor.

* * * * *

UNITED STATES PATENT AND TRADEMARK OFFICE
CERTIFICATE OF CORRECTION

| | |
|---|---|
| PATENT NO. | : 6,939,774 B2 |
| APPLICATION NO. | : 10/826606 |
| DATED | : September 6, 2005 |
| INVENTOR(S) | : Mark E. Viste et al. |

Page 1 of 1

It is certified that error appears in the above-identified patent and that said Letters Patent is hereby corrected as shown below:

On the title page item (73) Assignees: delete "Medtronics, Inc." and insert --Medtronic, Inc.--.

Signed and Sealed this

Twenty-sixth Day of December, 2006

JON W. DUDAS
*Director of the United States Patent and Trademark Office*